United States Patent [19]

Tokutomi et al.

[11] Patent Number: 4,580,042

[45] Date of Patent: Apr. 1, 1986

[54] FOCUSING POSITION DETECTING DEVICE USING A SECTOR SHAPED MIRROR

[75] Inventors: Seijiro Tokutomi; Osamu Shindo; Hideaki Yuda, all of Tokyo, Japan

[73] Assignee: Asahi Kogaku Kogyo Kabushiki Kaisha, Tokyo, Japan

[21] Appl. No.: 529,778

[22] Filed: Sep. 6, 1983

[30] Foreign Application Priority Data

Sep. 3, 1982 [JP] Japan ............................... 57-153735
Sep. 3, 1982 [JP] Japan ............................... 57-153736

[51] Int. Cl.$^4$ ................................................. G01J 1/20
[52] U.S. Cl. ........................................ 250/201; 250/204
[58] Field of Search ............... 250/201, 204; 354/400, 354/402, 406, 407, 408; 356/1, 4

[56] References Cited

U.S. PATENT DOCUMENTS 3,622,797 11/1971 Bragg ................................. 250/201
3,860,935 1/1975 Stauffer ............................. 354/407
4,083,056 4/1978 Nakamura et al. ................ 354/407
4,405,232 9/1983 Mansell ............................. 250/201

Primary Examiner—David C. Nelms
Assistant Examiner—J. Jon Brophy
Attorney, Agent, or Firm—Sughrue, Mion, Zinn, Macpeak and Seas

[57] ABSTRACT

A relay optical system used for focus detection including an optical lens system for forming the image of the exit pupil of a photographing lens, all or a part of said lens optical system for forming a secondary image of an image which is formed on a focusing plane by the photographing lens and a reflecting mirror provided in a plane where the image of said exit pupil is formed. The reflecting mirror is made up of a plurality of reflecting mirror portions which are obtained by dividing the reflecting mirror. The mirror portions divide the image of the exit pupil and have different optical axes, so that an image formed by the photographing lens is formed into secondary images the number of which is equal to the number of mirror parts. Sensor arrays are provided to receive the secondary images, respectively, to detect focusing from correlation of the images.

10 Claims, 9 Drawing Figures

FIG. 4
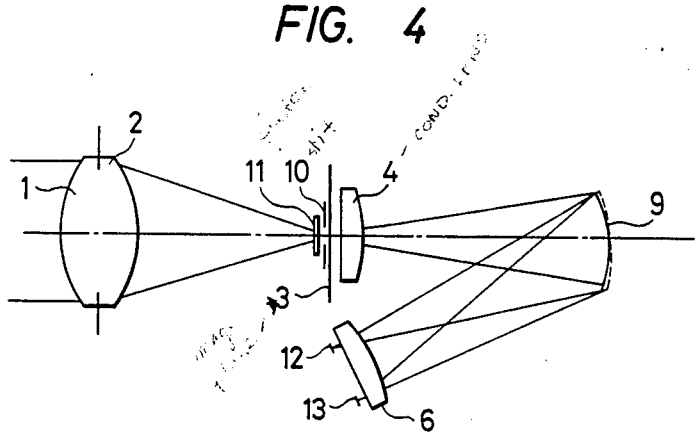
FIG. 5
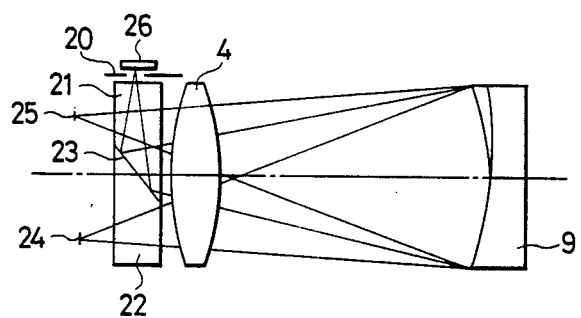
FIG. 6
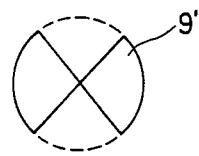
FIG. 7(a)    FIG. 7(b)    FIG. 7(c)
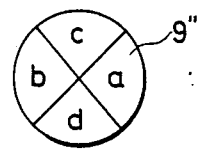   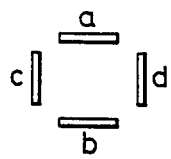   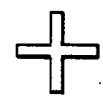

FOCUSING POSITION DETECTING DEVICE USING A SECTOR SHAPED MIRROR

BACKGROUND OF THE INVENTION

This invention relates to a focusing position detecting device for an optical device such as a camera. It is intended to eliminate aberrations which adversely affect the focusing position detecting operation from a focusing position detecting device which operates to detect alignment of two image parts which are obtained by dividing the image of an object, to detect focalization. Also, this invention provides an optical system which is compact and low in manufacturing cost.

A system for dividing an image into two image parts and aligning the two image parts to measure an aberration is known in the art (cf. "Optical Technique Handbook" pp. 246). A polarizing plate or an angle deflecting plate is employed as an optical system for practicing such a system. One application of the system to a focusing position detecting device is a split image prism provided for a focusing screen, for instance, in a camera.

For the focusing position detecting device, the following methods of dividing an image are available:

(1) In the first method, an image is divided into parts in the image plane.

(2) In the second method, an image forming light beam is divided into two light beams in the optical path other than the image plane.

The first method is employed for the focusing screen of a camera. In this method, different portions of an object are observed. Accordingly, the method is disadvantageous in that, if the parts of the object thus observed are different with the division line as the boundary, then focalization cannot be achieved. The second method is free from this drawback because the same portion of an object is observed.

A variety of Japanese Patent Applications have been filed for the second method: for instance, Japanese Patent Application Laid-Open No. 39544/1975, "Focus Detecting Device"; Japanese Patent Application Laid-Open No. 82419/1977, "Device for Photo-Electrically Determining where an Image is sharp"; and Japanese Patent Application Publication No. 13929/1982, "Focus Adjusting Device".

The optical system in each of these devices comprises a relay lens group for transmitting the image of an object to a sensor at the rear stage and an optical element for dividing an image forming light beam into two light beams. Some of the optical systems are added with other components, as the case may be. However, any one of the optical systems involves significant problems vis-a-vis aberration.

The first problem exists in a relay lens. In the case where an image is formed substantially in the ratio of 1:1 by the refracting system as in the prior art, it is very difficult to reduce symmetrical aberrations such as spherical aberration, an astigmatism, a curvature of field and a chromatic aberration on the axis. Accordingly, the number of lenses forming the optical system is necessarily increased.

The second problem is the location where a dividing optical element for dividing an image forming light beam into two light beams should be set. It is most effective to set the element at the place where the image of the exit pupil of the photographing lens is formed by the relay lens and other optical systems, such as, for instance, a condenser lens which is arranged close to the image plane. The arrangement of the optical element at this position is most effective in preventing reduction of the quantity of light due to vignetting. To the image of the exit pupil also, the symmetrical aberrations are harmful. Even if, when these symmetrical aberrations exist, light is uniformly applied to the pupil by an object which is uniform in brightness, the outputs of the elements of the sensor are not uniform in the case where the image of the exit pupil is within the effective diameter of the dividing optical element.

SUMMARY OF THE INVENTION

Accordingly, an object of this invention is to provide a focusing position detecting device in which the above-described two problems have been solved and which is simple and compact and is made up of optical systems low in cost.

In accordance with this invention, a relay optical system for focus detection includes an optical lens system for forming the image of the exit pupil of a photographing lens, and all or a part of the lens optical system for forming a secondary image of an image which is formed on a focusing plane by the photographing lens. A reflecting mirror is provided in a plane where the image of the exit pupil is formed. The reflecting mirror is made up of a plurality of reflecting mirror portions which are obtained by dividing the reflecting mirror. The mirror portions divide the image of the exit pupil and have different optical axes, so that an image formed by the photographing lens is formed into secondary images, the number of which is equal to the number of mirror portions. Sensor arrays are provided to receive the secondary images, respectively, to detect focusing from correlation of the images on the sensor arrays.

This invention will be described in detail by referring to the drawing and the description of the preferred embodiment that follows.

BRIEF DESCRIPTION OF THE DRAWINGS

FIG. 4 is an explanatory diagram showing one embodiment of a focusing position detecting device according to the invention;

FIG. 5 illustrates a second embodiment of a focusing position detecting device according to the invention; and FIGS. 6 and 7 are explanatory diagrams showing other examples of the divided concave mirror in the device of the invention.

DESCRIPTION OF THE PREFERRED EMBODIMENTS

Figure 1:
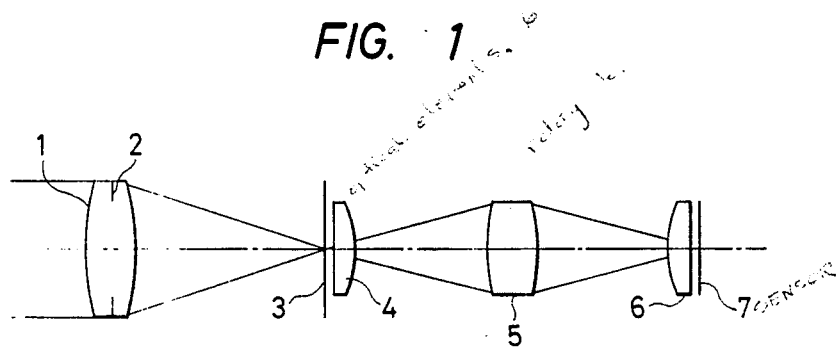
FIGS. 1 and 2 are explanatory diagrams for a description of the fundamental optical system of this invention.

This invention will be described with reference to the accompanying drawings. The fundamental structure of the optical system is a so-called "life size system" in which the image of an object is formed, in its life size, on the sensor, as shown in FIG. 1. In FIG. 1, reference numeral 1 designates a photographing lens; 2, the exit pupil of the photographing lens 1; 3, the image plane of the photographing lens 1; 4, a condenser lens; 5, a relay lens; 6, a condenser lens; and 7, a sensor. When the optical elements 4 and 6 are arranged symmetrical with the relay lens 5 as shown in FIG. 1, the image of the exit pupil 2 is close to the relay lens and symmetrical aberrations such as comas or distortions can be completely eliminated. However, in this case, it is difficult to eliminate an asymmetrical aberration attributed to the relay lens, and therefore the first problem is not solved.

Figure 2:
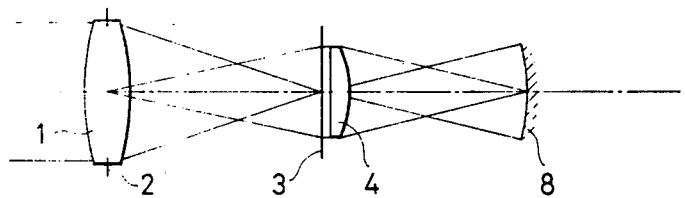

If a concave mirror 8 is used instead of the relay lens to fold the optical system of FIG. 1 at the concave mirror as shown in FIG. 2, then no chromatic aberration is caused because refraction is not utilized. Furthermore, employment of a concave mirror in the life size system can completely eliminate spherical aberration. In FIG. 2, the exit pupil 2 of the photographing lens 1 is imaged onto the concave mirror 8 by the condenser lens 4.

In order to form a focusing position detecting device with the optical system in FIG. 2, the following conditions must be satisfied: (1) A sensor is set in the image forming plane of a relay optical system comprising the condenser lens 4 and the concave mirror, without causing a bad influence into the system such as, for instance, vignetting effects to other parts. (2) The image is divided into several portions, and the image portions are formed respectively on sensors the number of which is equal to the number of image portions.

Figure 3:
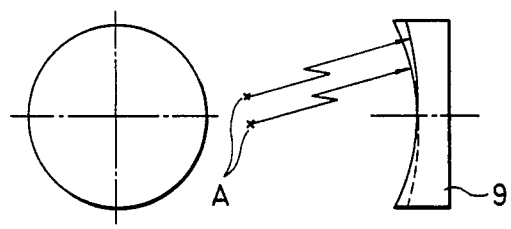
FIG. 3 is an explanatory diagram showing the structure of a divided concave mirror.

FIG. 3 shows a concave mirror 9 in the case where the image is divided into two portions. The concave mirror 9 is divided into two portions: the right and left mirror portions, respectively. The centers of the curvatures of the mirror parts are slightly shifted along the dividing line.

FIG. 4 shows one preferred embodiment of this invention using the optical system shown in FIGS. 2 and 3. In FIG. 4, reference numeral 9 designates the divided concave mirror as described with reference to FIG. 3; 10, a slit; 11, a filter; and 12 and 13, sensors for receiving image parts. The divided concave mirror 9 is tilted with respect to the optical axis of the photographing lens 1 in order to deflect the reflected light beam from the optical axis. The slit 10 is provided in the image plane in order to prevent cross-talk of image portions or stray light between the two sensors. The filter is used to compensate the spectral sensitivity characteristics of the sensors 12 and 13.

In this system, a light beam from the photographing lens 1 is applied through the filter 11 and the slit 10 to the condenser lens 4. The light beam passing through the condenser lens is divided into two light beams when reflected by the concave mirror 9. The two light beams are applied to the condenser lens in a condensation mode and are then applied respectively to the two sensors, 12 and 13.

FIG. 5 illustrates a second embodiment of this invention also employing the optical system described with reference to FIGS. 2 and 3. In FIG. 5, reference numeral 9 designated the divided concave mirror shown in FIG. 3. Also, in FIG. 5, 20, a slit; 21 and 22, prism members; 23, a reflecting mirror; 24 and 25, two sensors for receiving image portions which are obtained by dividing an image; and 26, a filter for compensating the spectral sensitivity characteristics of the sensors 24 and 25. The slit 20 is provided in the image plane in order to prevent cross-talk of image parts and stray light and it may be integral with the filter 26. The reflecting mirror 23 changes the direction of a light beam incident to the detecting optical system so that the incident light beam may not overlap image forming light beams to the sensors. The prism members 21 and 22 are used to hold the reflecting mirror and to make the optical distances of the image forming light beams to the two sensors equal.

A light beam passed through the filter 26 and the slit 20 from above is reflected by the reflecting mirror and is then applied to the condenser lens 4. The light beam which has passed through the condenser 4 is divided into two light beams when reflected by the divided concave mirror 9. The two light beams are applied to the condenser lens 4 in a condensation mode. The light beams passed through the condenser lens 4 are applied to the two sensors 24 and 25 through the spaces above and below the reflecting mirror 23.

In the embodiments shown in FIGS. 4 and 5, each of the mirror portions (9) is in the form of a semicircle. However, other configurations may be employed for the mirror portions to effectively utilize the features of the invention, thereby improving performance.

FIG. 6 shows another example of the divided concave mirror. In the example, the divided concave mirror 9 comprises sector-shaped concave mirror parts. In this case, light beam components which do not contribute to the movement of the image in the lateral direction are removed, so that an amount of shift between image parts with respect to an amount of extension of the photographing lens is increased; that is, the detection sensitivity is increased.

In the embodiments in FIGS. 4 and 5 the detection is effected only in one direction perpendicular to the sensors. On the other hand, if the optical system in FIG. 4 is modified so that a divided concave mirror 9" comprising four mirror portions as shown in FIG. 7(A) is provided, four sensors a, b, c and d are arranged in correspondence with the reflecting surfaces a, b, c and d of the mirror portions, respectively, as shown in FIG. 7(B). Also, a cross-shaped slit is shown in FIG. 7(C) which may be employed and then a focusing position detecting device in which detection is effected in the longitudinal and lateral directions can be provided.

As is apparent from the above description, according to this invention, the image of an object is divided into image portions by a divided concave mirror which is set in the image forming plane of the exit pupil of the photographing lens, and the alignment of the image parts is detected. Therefore, (1) Non-uniformity in the amount of light due to vignetting is not significant, and therefore the amount of light can be effectively utilized.

(2) No optical cross-talk results between the image parts.

(3) The symmetrical aberration and the spherical aberration of the optical system and the chromatic aberration on the axis, which adversely affect focus detection, are eliminated.

(4) The optical components are simple in construction and small in number. Accordingly, the focusing position detecting device is low in manufacturing cost.

(5) The device, being compact, can be installed, for instance, on the bottom of a camera.

The focusing position detecting device according to the invention is significantly advantageous in these points.

We claim:

1. A relay optical system for a focusing detector comprising; an optical lens system including a condenser lens for forming the image of the exit pupil of a photographing lens, and a reflecting mirror for forming a secondary image of an image which is formed on a focusing plane by said photographing lens and said reflecting mirror arranged conjugately to said reflecting mirror; said reflecting mirror made up of a plurality of reflecting mirror portions which are obtained by dividing said reflecting mirror into two pairs of sector-shaped mirror parts, each pair arranged as opposite sectors of a circle, said mirror portions dividing the image of said exit pupil and have different optical axes so that an image formed by said photographing lens is formed into a plurality of secondary images which are equal to the number of mirror parts, and sensor arrays provided to receive said secondary images, respectively, to detect focusing from correlation of the images on said sensor arrays.

2. A device as claimed in claim 1, wherein said divided reflecting mirror is a divided concave mirror.

3. A device as claimed in claim 2, in which said divided concave mirror comprises two pairs of sector-shaped concave mirror parts each pair arranged as opposed sectors of a circle.

4. A device as claimed in claim 1, in which a slit is provided in the focusing plane of said photographing lens.

5. The device as claimed in claim 1, further comprising an optical axis redirecting reflecting mirror for changing an optical axis in a portion of said lens optical system, said mirror portions arranged so that the optical axes thereof are in planes including optical axes before and after reflection, said secondary images being formed in the planes of reflection of said mirror portions orthogonal of said optical axis changing reflecting mirror.

6. The device as claimed in claim 5, wherein said secondary images are separated from each other.

7. The device as claimed in claim 5, wherein said secondary images are formed in a plane of reflection of said mirror portions vertical to said optical axis reflecting mirror.

8. The device as claimed in claim 5, wherein said secondary images are formed in a plane of reflection of said mirror portions horizontal to said optical axis reflecting mirror.

9. A device as claimed in claim 5, in which said divided reflecting mirror is a divided concave mirror.

10. A device as claimed in claim 5, in which a slit is provided in the focusing plane of said photographing lens.

* * * * *